United States Patent [19]

Schliessner

[11] Patent Number: 5,588,683
[45] Date of Patent: Dec. 31, 1996

[54] ANTI-RESONANCE PIPE CLIP

[75] Inventor: Lothar Schliessner, Linden, Germany

[73] Assignee: Emhart, Inc., Newark, Del.

[21] Appl. No.: 374,068

[22] Filed: Jan. 19, 1995

[30] Foreign Application Priority Data

Jan. 27, 1994 [DE] Germany .................... 9401393 U

[51] Int. Cl.$^6$ .................... F16L 3/08; F16L 3/22
[52] U.S. Cl. .................... 285/62; 285/137.1; 248/60; 248/74.2; 248/71
[58] Field of Search .................... 285/137.1, 61, 285/62; 248/60, 71, 74.2, 74.3, 68.1

[56] References Cited

U.S. PATENT DOCUMENTS

| | | | |
|---|---|---|---|
| 3,977,486 | 8/1976 | Kleinschmit | 248/60 |
| 4,655,423 | 4/1987 | Schavilje et al. | 248/71 |
| 4,865,281 | 9/1989 | Wollar | 248/74.2 |
| 4,917,340 | 4/1990 | Jüemann et al. | 248/74.2 |
| 4,953,801 | 9/1990 | Oikawa | 248/60 |
| 4,989,822 | 2/1991 | Fannon | 248/60 |
| 5,016,336 | 5/1991 | Barnett et al. | 248/74.2 |
| 5,085,384 | 2/1992 | Kasuble | 248/74.2 |
| 5,133,523 | 7/1992 | Daigle | 248/74.2 |
| 5,233,881 | 10/1993 | Sayen et al. | 248/71 |
| 5,243,138 | 9/1993 | Gutnke et al. | 248/74.2 |

FOREIGN PATENT DOCUMENTS

| | | |
|---|---|---|
| 8816188.9 | 2/1989 | Germany . |
| 9011879 | 10/1990 | Germany . |
| 9305934.5 | 9/1993 | Germany . |
| 2166794A | 5/1986 | United Kingdom . |

*Primary Examiner*—Eric K. Nicholson
*Attorney, Agent, or Firm*—E. D. Murphy

[57] ABSTRACT

A plastics pipe clip comprising at least one article-securing member carried on a support mount adapted to be engaged on a stud projecting from a surface to which the pipe is to be secured having the article-securing member mounted on a flexible bridge member carried by the support mount. The flexible bridge member may straddle the support mount or the support mount may be offset and located at or towards one end of the flexible bridge member. The flexible bridge member may be carried between two rounded, flexing elements attached directly or indirectly to the support mount. A plurality of article-securing members may be mounted on the flexible bridge member and these may be sized to carry pipes and cables of similar diameter or pipes and cables of different diameters.

3 Claims, 3 Drawing Sheets

ANTI-RESONANCE PIPE CLIP

The present invention relates to pipe clips of plastics material used to secure elongate articles such as pipes, tubes or cables to a stud projecting from a surface. Such clips are used, for example, to attach fuel pipes, brake lines and electric cables to the bodies of motor vehicles, often attached to studs welded to the surface of the car bodies. Such clips produced are used in many variations and examples produced by the present applicant's employers are described in GB 2 098 699 and GB 2 129 863.

In some cases, however, it is possible for pipes and cables held in such clips to resonate and transmit vibrations generated, for example, by the engine and fuel pumps and by the general running of the motor vehicle.

It is an object of the present invention to provide a plastics pipe clip which reduces the tendency to resonate and the transmission of vibration by a pipe or cable secured in the clip.

According to the present invention we provide a plastics pipe clip comprising at least one article-securing member carried on a support mount adapted to be engaged on a stud projecting from a surface to which a pipe or cable is to be secured characterised in that the article-securing member is mounted on a flexible bridge member carried by the support mount.

The flexible bridge member may straddle the support mount or the support mount may be offset and located at or towards one end of the flexible bridge member.

In one preferred embodiment, the flexible bridge member is carried between two rounded, flexing elements attached directly or indirectly to the support mount.

A plurality of article-securing members may be mounted on the flexible bridge member and these article-securing members may be sized to carry pipes and cables of similar diameter or may be sized to carry pipes and cables of different diameters.

Since the article-securing members are not attached directly to the support mount but are carried by the flexible bridge member, vibrations of a pipe or cable secured in an article-securing member are effectively absorbed and such vibrations thereby dampened. Resonation in or induced in pipes and cables secured in pipe clips according to the invention is thus greatly diminished.

A cover-may be incorporate in the pipe clip of the invention which preferably abuts the surface to which the stud engaging the pipe clip is attached. If desired the cover may extend along the pipes and cables secured by the pipe clip and a long cover may even incorporate a plurality of pipe clips.

In order that the invention be better understood, a number of embodiments will now be described in greater detail by way of example with reference to the accompanying drawings in which.

Figure 1:
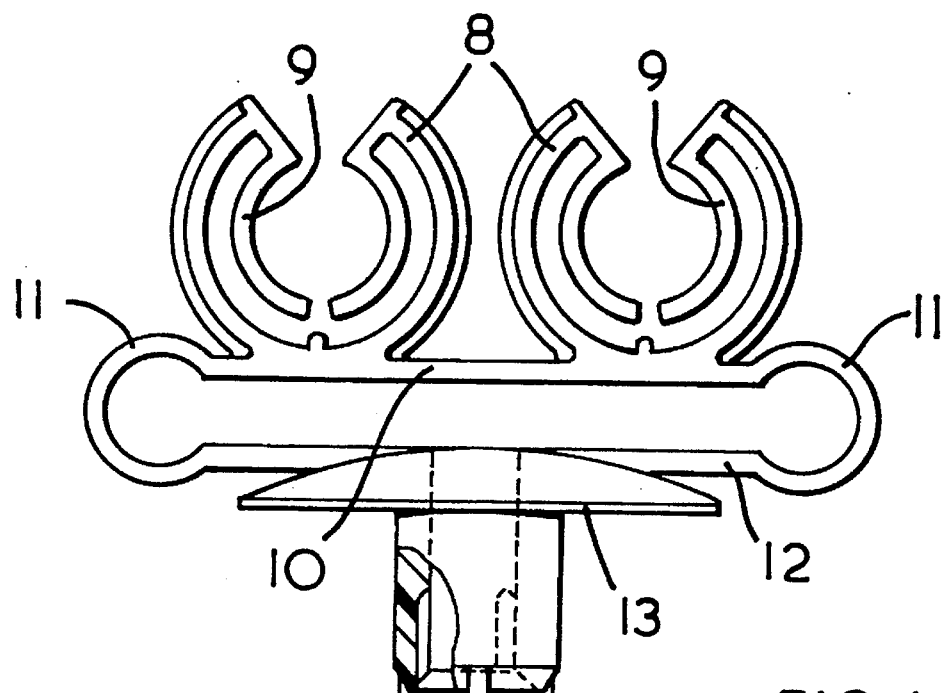
FIG. 1 is a side view of a pipe clip according to the present invention designed to carry a pair of equi-sized pipes.
Figure 2:
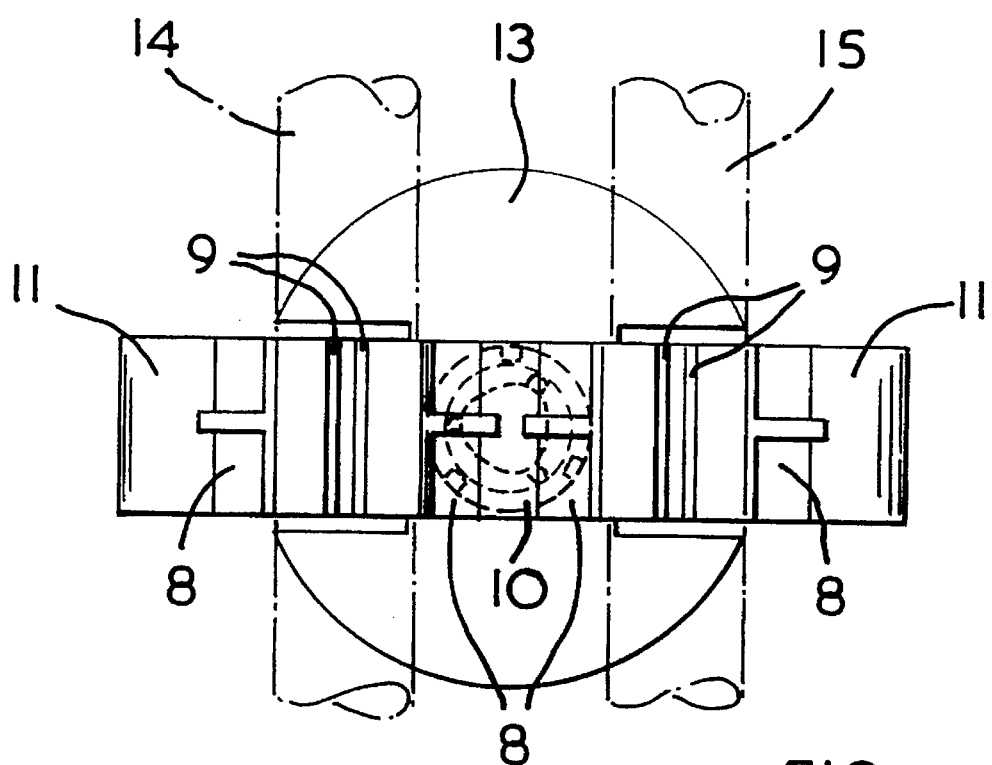
FIG. 2 is a plan view of the pipe clip of FIG. 1 with an indication of two pipes secured therein.

Referring to FIGS. 1 and 2, two article-securing members (8) are each provided internally with a pair of flexible pipe locating fingers (9). The article-securing members (8) are mounted on a flexible bridge member (10) which extends between two rounded, flexing elements (11) which are attached by a web (12) to a support mount (13). The support mount (13) is designed to engage a stud (not shown) which is attached to a panel of a car body.

In use, a pair of pipes (14,15) is located within the article-securing members (8) and when the support mount (13) engages the stud, the pipes (14,15) are thereby secured to the car body panel. When the pipes are so secured the flexible bridge member (10) serves to absorb vibrations generated in the pipes (14,15).

Figure 3:
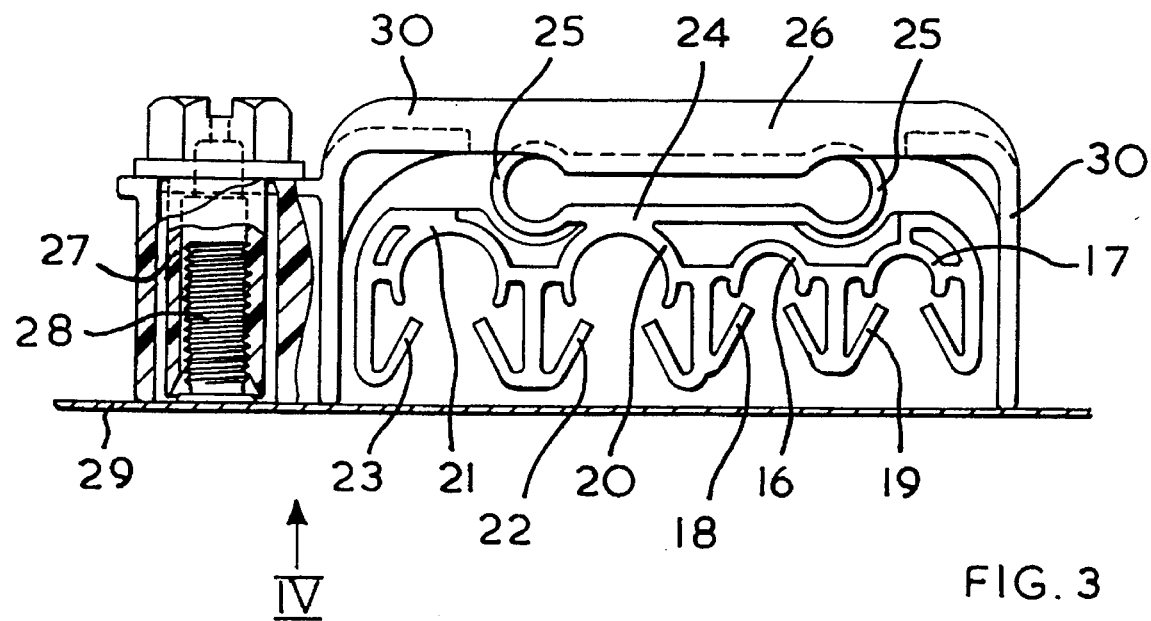
FIG. 3 is a side view of a pipe clip according to the present invention designed to carry one pair of pipes or cables of the same size and a second pair of smaller pipes or cables, and mounted on a car body.
Figure 4:
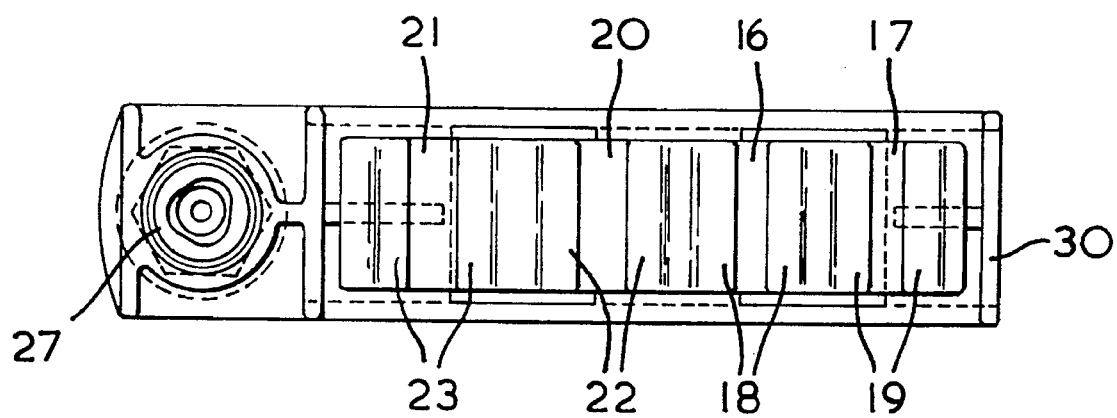
FIG. 4 is a view in the direction of arrow IV of the pipe clip of FIG. 3.

Referring to FIGS. 3 and 4, two article-securing members are formed by cradle portions (16,17) cooperating respectively with flexible, pipe locating fingers (18,19) and two larger article-securing members are formed by cradle portions (20,21) cooperating with flexible, pipe-locating fingers (22,23). These four article-securing members are carried on a flexible bridge member (24) which extends between two rounded, flexing elements (25) which are carried by a web (26) which is attached to support mount (27). Support mount (27) is mounted at one end of web (26) and bridge member (24), and engages a weld stud (28) which is welded to car body panel (29). Web (26) extends to form a cover (30) which contacts panel (29) to form a neat and protective seal over the pipe clip.

When pipes and cables are carried in the article-securing members, and secured to the support mount attached to the car body through the flexible bridge member, vibrations generated along the pipes and cables are dampened by the pipe clip.

Figure 5:
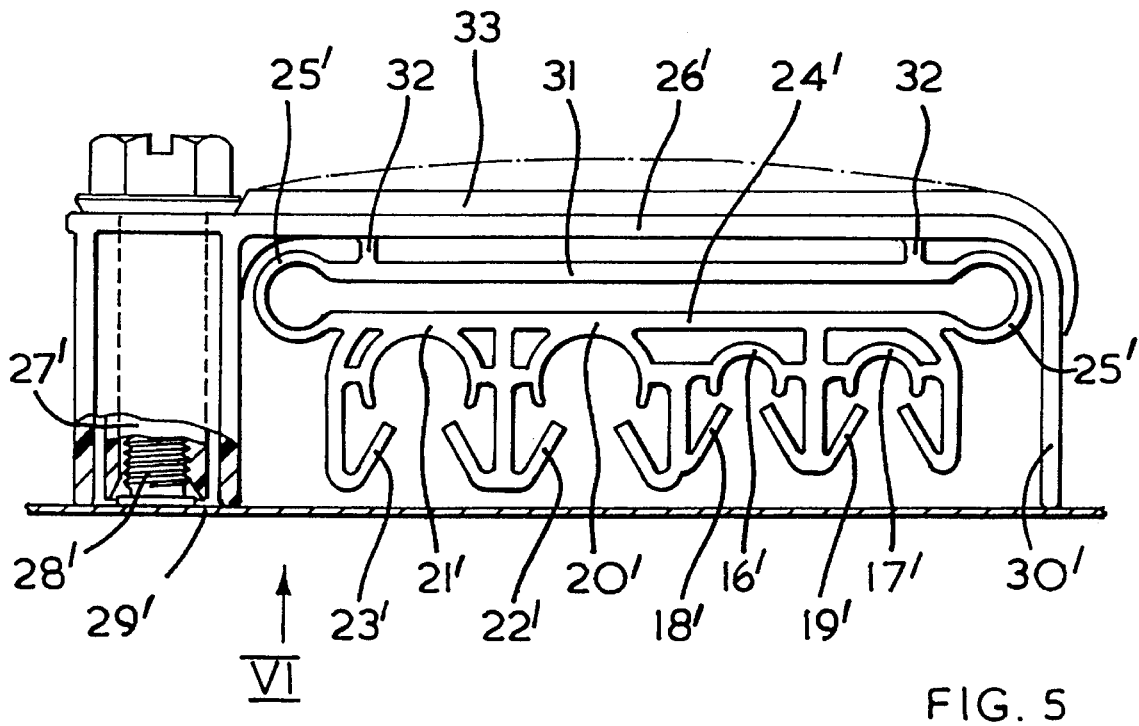
FIG. 5 is a side view of a modification of the pipe clip of FIG. 3.
Figure 6:
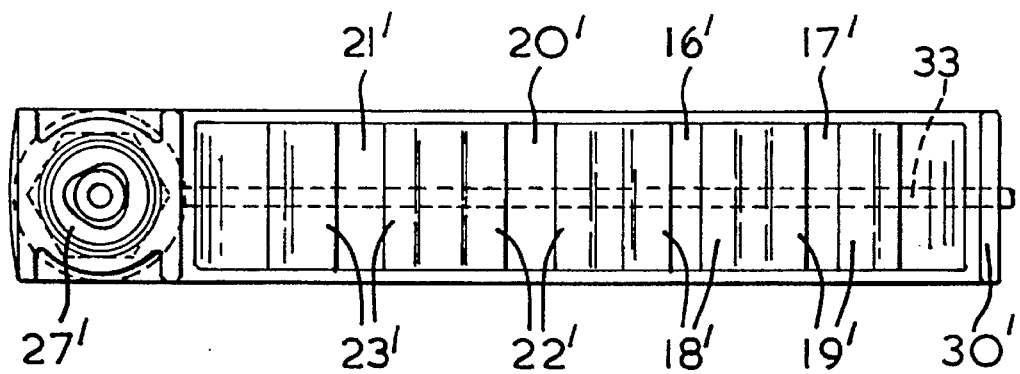
FIG. 6 is a view in the direction of arrow VI of the pipe clip of FIG. 5.

Referring to FIGS. 5 and 6, again two article-securing members are formed by cradle portions (16',17') cooperating respectively with flexible, article-securing fingers (18',19') and two larger article-securing members, are formed by cradle portions (20',21') cooperating with flexible, pipe-locating fingers (22',23'). These four article-securing members are carried on an elongated flexible bridge member (24') which extends between two rounded, flexing elements (25') which are linked by a second flexible bridge member (31) which is mounted on two supports (32) carried on web (26') which is attached to support mount (27'). Support mount (27') is mounted at one end of web (26') and bridge members (24',31) and engages a weld stud (28') which is welded to car body panel (29'). Web (26') extends to form a cover (30') which contacts panel (29') to form a neat and protective seal over the pipe clip. The cover (30') is stiffened by a rib (33).

The inclusion of the second flexible bridge member (31) increases the resilience between the article-securing members and the support mount and can improve the capacity of the pipe clip to absorb vibrations generated along pipes and cables carried thereby.

The term "pipe" is used throughout this specification to include pipes, tubes, cables and all such linear and elongate articles.

I claim:

1. A resilient pipe clip for supporting elongated tubular objects in an automobile so as to reduce vibration thereof, said clip comprising a support mount adapted to be attached to and supported on a surface in an automobile;

a web member extending from said support mount, said web member being spaced from and generally parallel to the surface;

at least one article securing member for receiving and retaining a tubular object, said article securing member being disposed on the side of said web facing the surface;

a flexible bridge member attached to said article securing member; and a pair of curved flexing elements each connected to one end of said bridge member and to said web to resiliently support said bridge member in a position spaced from said support mount to reduce vibration of the tubular object.

2. A resilient pipe clip for supporting elongated tubular objects in an automobile so as to reduce vibration thereof, said clip comprising a support mount adapted to be attached to and supported on a surface in an automobile;

a web member extending from said support mount, said web member being spaced from and generally parallel to the surface;

at least one article securing member for receiving and retaining a tubular object, said article securing member being disposed on the side of said web facing the surface;

a flexible bridge member attached to said article securing member; and a pair of curved flexing elements each connected to one end of said bridge member and to said web to resiliently support said bridge member in a position spaced from said support mount to reduce vibration of the tubular object;

said web further including a pair of legs extending therefrom to abut the surface of the automobile.

3. A resilient pipe clip for supporting elongated tubular objects in an automobile so as to reduce vibration thereof, said clip comprising a support mount adapted to be attached to and supported on a surface in an automobile;

a web member extending from said support mount, said web member being spaced from and generally parallel to the surface;

at least one article securing member for receiving and retaining a tubular object, said article securing member being disposed on the side of said web facing the surface;

a first flexible bridge member attached to said article securing member;

a second flexible bridge member attached to and spaced from said web member; and a pair of curved flexing elements each connected between one end of said first bridge member and said second bridge member to resiliently support said first bridge member in a position spaced from said second bridge member to reduce vibration of the tubular object.

* * * * *